United States Patent [19]
Dooley et al.

[11] Patent Number: 5,381,492
[45] Date of Patent: Jan. 10, 1995

[54] FIBER OPTIC VIBRATION SENSOR

[75] Inventors: Joseph B. Dooley, Harriman; Jeffrey D. Muhs, Lenoir City; Kenneth W. Tobin, Harriman, all of Tenn.

[73] Assignee: Martin Marietta Energy Systems, Inc., Oak Ridge, Tenn.

[21] Appl. No.: 196,963

[22] Filed: Feb. 15, 1994

[51] Int. Cl.6 .......................... G02B 6/02; H01J 5/16; G01B 9/02; G01L 1/24
[52] U.S. Cl. ........................... 385/12; 385/27; 385/15; 385/31; 385/36; 385/42; 385/88; 385/92; 356/345; 73/800; 250/227.11; 250/227.14; 250/227.18; 250/227.19
[58] Field of Search ................... 385/12, 13, 15, 27, 385/28, 30, 31, 32, 42, 43, 36, 46, 48, 49; 356/345; 250/227.11, 227.14, 227.16, 227.18, 227.19, 227.23; 73/800, 795

[56] References Cited

U.S. PATENT DOCUMENTS

| | | | |
|---|---|---|---|
| 4,191,470 | 3/1980 | Butter | 73/800 X |
| 4,313,185 | 1/1982 | Chovan | 367/149 |
| 4,427,881 | 1/1984 | Rueil | 250/227.11 X |
| 4,449,781 | 5/1984 | Lightstone et al. | 385/43 X |
| 4,482,890 | 11/1984 | Forbes et al. | 340/556 |
| 4,525,626 | 6/1985 | Kush et al. | 250/227.11 X |
| 4,530,078 | 7/1985 | Lagakos et al. | 385/13 X |
| 4,534,222 | 8/1985 | Finch et al. | 73/653 |
| 4,586,784 | 5/1986 | Tremblay et al. | 385/43 X |
| 4,652,129 | 3/1987 | Martinelli | 356/345 |
| 4,656,421 | 4/1987 | Ellis et al. | 356/345 X |
| 4,768,880 | 9/1988 | Tur et al. | 356/345 |
| 4,830,449 | 5/1989 | Spillman, Jr. | 385/12 X |
| 4,897,543 | 1/1990 | Kersey | 356/345 X |
| 4,951,271 | 8/1990 | Garrett et al. | 367/141 |
| 4,959,539 | 9/1990 | Hofler et al. | 250/227.19 |
| 5,012,088 | 4/1991 | Cole et al. | 250/227.19 |
| 5,089,695 | 2/1992 | Willson et al. | 250/227.21 |
| 5,095,514 | 3/1992 | Curtis | 385/12 |
| 5,132,529 | 7/1992 | Weiss | 250/227.16 |
| 5,140,559 | 8/1992 | Fisher | 356/345 X |
| 5,201,015 | 4/1993 | Von Bieren et al. | 385/13 |
| 5,224,182 | 6/1993 | Murphy et al. | 385/12 |
| 5,259,045 | 11/1993 | Azuma et al. | 385/13 X |
| 5,336,883 | 8/1994 | Hobby et al. | 250/227.17 |

OTHER PUBLICATIONS

"Introduction to Optical Fiber Components and Systems", Michael Corke, Optical/Optoelectronic Engineering Update Series, Update Coures U5, Winter 1987.

Primary Examiner—Brian Healy
Attorney, Agent, or Firm—Earl Larcher; W. Mark Bielawski; Herman L. Holsopple

[57] ABSTRACT

A fiber optic vibration sensor utilizes two single mode optical fibers supported by a housing with one optical fiber fixedly secured to the housing and providing a reference signal and the other optical fiber having a free span length subject to vibrational displacement thereof with respect to the housing and the first optical fiber for providing a signal indicative of a measurement of any perturbation of the sensor. Damping or tailoring of the sensor to be responsive to selected levels of perturbation is provided by altering the diameter of optical fibers or by immersing at least a portion of the free span length of the vibration sensing optical fiber into a liquid of a selected viscosity.

14 Claims, 2 Drawing Sheets

FIBER OPTIC VIBRATION SENSOR

This invention was made with the support of the United States Government under contract No. DE-AC05-84OR21400 awarded by the U.S. Department of Energy. The United States Government has certain rights in this invention.

BACKGROUND OF THE INVENTION

The present invention relates generally to a sensor for detecting vibrational disturbances, and more particularly to a fiber optic, three-dimensional, sensor capable of detecting and measuring disturbances of the sensor as caused by motion or vibration.

Various alarm systems sensitive to motion or vibrational disturbances are presently used for protecting homes, autos, businesses, machinery, and other valuables from intrusion or theft by providing appropriate signals when the alarm system senses an intrusion into the sensor-protected area or a disturbance to a sensor-protected object. The more sophisticated alarm systems are capable of detecting movements or vibrations over a relatively wide range of frequencies and amplitudes. Also, other systems rely upon the measurement of mechanical vibrations for assessing the condition of machines and mechanical equipment. Many of these wide band alarm and sensor systems have been found to be relatively complex and commonly rely on servo accelerometers and their accompanying electronic modules for providing the desired response to motion or vibrational disturbances over a selected range of frequencies and amplitudes.

More recent developments in intrusion detecting systems utilize an arrangement of optical fibers sensitive to the weight of intruder for providing the alarm. One such intrusion detector system is described in U.S. Pat. No. 4,482,890 where light pulses are transmitted through one of two parallel arrays of optical fibers. When light transmitting the optical fiber array is subjected to "micro-bending" by the weight of the intruder, this fiber array undergoes deformation so as to cause the light pulses passing through the fiber array to be refracted through the light-reflecting cladding of the optical fiber into the other optical fiber array to provide light pulses therein which provide a signal indicative of the intrusion. Another fiber optic sensor development utilizes single mode optical fibers which are arranged to interferometrically sense motion. One such interferometric fiber optic sensor is a Michelson interferometer in which light from a laser is split into two beams by a splitter/coupler for transmitting a beam of light through each of a pair of single mode optical fibers. One of these two optical fibers provides a reference signal while the other optical fiber provides for motion sensing signal. The two laser light beams transmitted through the optical fibers are reflected at the ends thereof and recombined at the splitter/coupler and then transmitted to a photo detector. Any optical path differences that occur in the light transmitted through the motion sensing optical fiber produces a change in the output signal from the photo detector with this change being indicative of the vibration or motion introduced into the motion sensing optical fiber of the interferometer. A Michelson Interferometer is generally described in the publication "Introduction to Optical Fiber Components and Systems" by Michael Corke, Optical/Optoelectronic Engineering Update Series, Update Course U5, Winter 1987, pp 63–65 and 104–119. This publication is incorporated herein by reference.

In the presently known interferometers using single mode optical fibers such as in the Michelson Interferometers, both of the optical fibers are very sensitive to vibration and/or motion. Thus, since the optical fiber providing the reference signal is subjected to vibrations and motion, especially during abrupt movement or when subjected to high frequencies or amplitudes, the output signal from the interferometer can be compromised so as to provide an output signal that often inaccurately reflects the extent of the displacement of the motion sensing optical fiber as caused by the intrusion of the alarmed area or the movement of the alarmed object. This sensitivity of the optical fiber providing the reference signal detracts from the utilization of the sensor as a motion or vibration sensor especially one capable of accurately measuring the extent of the intrusion or motion.

SUMMARY OF THE INVENTION

Accordingly, it is a principal aim or objective of the present invention to provide a fiber optic vibration sensor utilizing a Michelson type interferometer wherein the optical fiber providing the reference signal is fixedly secured in a housing so as to obviate vibration or motion displacement thereof relative to the housing and the vibration and/or motion sensing optical fiber during the vibration or movement of the latter. Generally, the fiber optic vibration sensor of the present invention comprises: a housing; first elongated optical fiber means having first and second oppositely disposed end regions and fixedly supported over substantially the full length thereof to the housing; second elongated optical fiber means having first and second oppositely disposed end regions fixedly supported by the housing and provided with a central region that is spatially separated from the housing for relative movement thereof with respect to both the housing and the first optical fiber means; light source means for providing a beam of light at a selected frequency; light beam splitting means optically coupled to the first end region of the first and second optical fiber means and adapted to receive and split the beam of light emanating from the laser into first and second light beams for the respective transmission thereof along optical paths provided through the first and second optical fiber means, light beam coupling means optically connected to the second end region of the first and second optical fiber means for receiving and combining the light transmitted through the first and second optical fiber means; light detecting means optically connected to the light beam coupling means for receiving the light therefrom and providing signals indicative of any changes in the light transmitted through the first and second optical fiber means as caused by a change in the optical path of the light transmitted through the second optical fiber means upon the relative movement thereof; and fringe counting means connected to the light detecting means for receiving the signals therefrom and for providing a signal indicative of any change in the frequency of light transmitted through the first and second optical fiber means.

Additionally, since the vibration or motion sensing optical fiber is particularly sensitive to minute vibrations or movements of the sensor, the sensor can be tailored to be responsive to any selected level of vibration or movement. This selective tailoring of the sensitivity of the sensor is achieved by preselecting the size, density and crosssectional shape of the optical fibers or, more preferably, by immersing at least a portion of the vibration sensing optical fiber in a pool of liquid to dampen the vibrations of the optical fiber. By utilizing the pool of liquid and selecting the particular viscosity of the liquid and the portion of the sensor immersed in the liquid, the tailoring of the vibration sensor to be sensitive to particular level of frequencies or amplitudes can be readily achieved.

Tailoring of the sensor response to any selected level of vibration or movement can also be accomplished by encasing the vibration-sensing optical fiber in an enclosed volume and then filling the enclosed volume with a gas or mixture of gases at a selected pressure to provide the vibration-damping mechanism.

Other and further objects of the present invention will become obvious upon an understanding of the illustrative embodiments about to be described or will be indicated in the appended claims, and various advantages not referred to herein will occur to one skilled in the art upon employment of the invention in practice.

Preferred embodiments cf the invention have been chosen for the purpose of illustration and description. The preferred embodiments illustrated are not intended to be exhaustive nor to limit the invention to the precise forms shown. The preferred embodiments are chosen and described in order to best explain the principles of the invention and their application and practical use to thereby enable others skilled in the art to best utilize the invention in various embodiments and modifications as are best adapted to the particular use contemplated.

DETAILED DESCRIPTION OF THE INVENTION

As briefly described above, the present invention is directed to a fiber optic vibration sensor based on a Michelson interferometer such as described in the aforementioned publication and improved upon to provide output signals which more accurately measure the extent and type of an intrusion into a sensor-alarmed area or the displacement of an object supporting the subject sensor.

Figure 1:
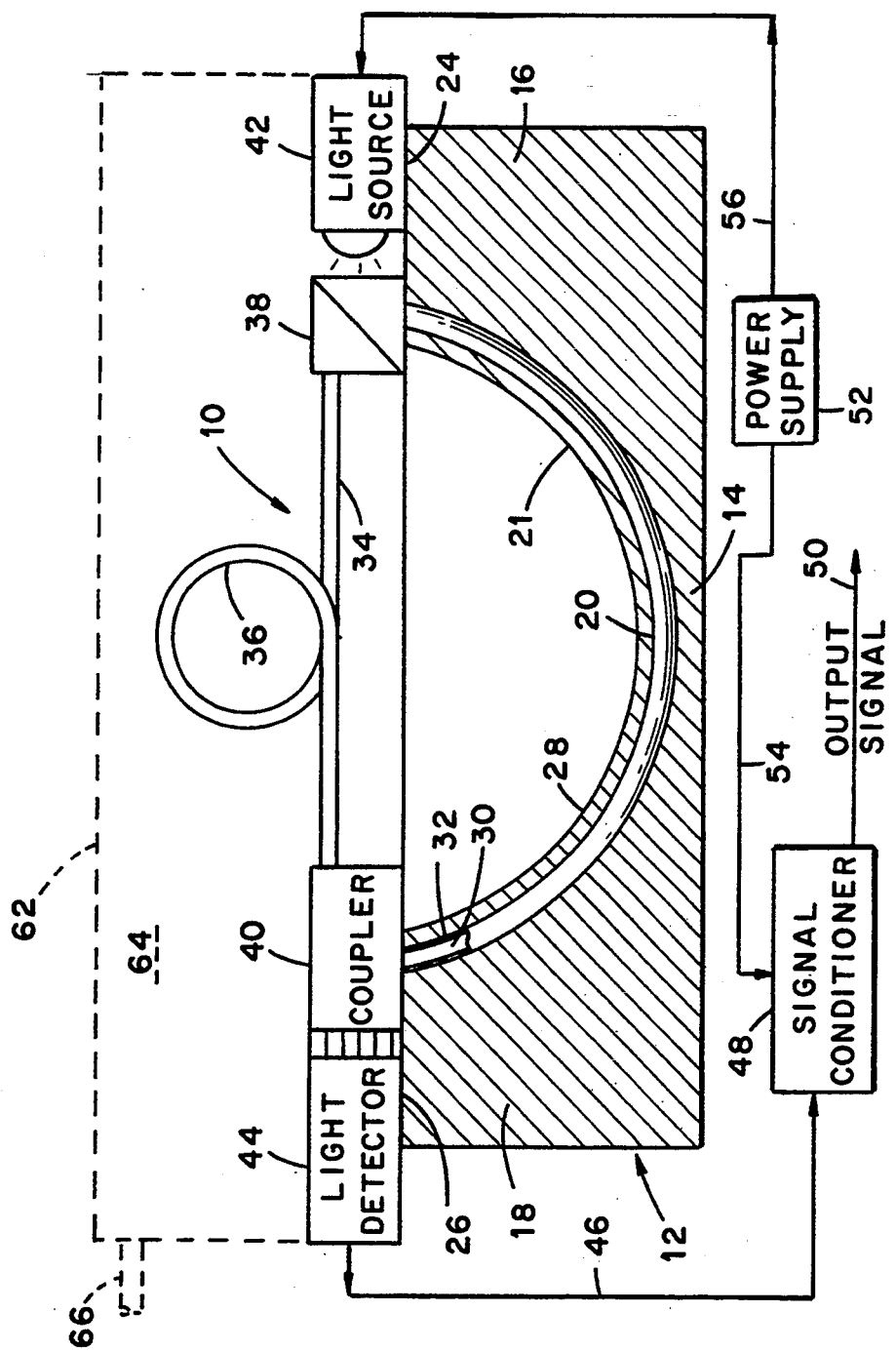
FIG. 1 is a schematic view of one embodiment of the fiber optic vibration sensor of the present invention.

With reference to the embodiment of FIG. 1, the fiber optic sensor generally shown at 10 comprises a generally U-shaped housing 12 formed of any suitable relatively rigid material such as plastic or metal and defined by a base section 14 with horizontally spaced apart upright walls or housing sections 16 and 18. The housing 12 is shown provided with an elongated bore or passageway 20 at a location adjacent to the innermost surface 21 of the housing 12. This passageway 20 can be formed in any suitable manner such as by casting, boring, or the like and traverses the full expanse of the base section 14 and the upright section 16 and 18 with the opposite ends of the passageway 20 being open and communicating with the upper planar surface regions 24 and 26 of the upright housing sections 16 and 18. This passageway 20 has a diameter slightly greater than that of the diameter of the selected single mode optical fiber 28 for receiving this optical fiber 28 over the substantially full length thereof so that only the opposite end sections of the optical fiber 28 projecting from the open ends of the passageway 20. If the diameter of the passageway 20 is found to be excessively large so as to permit the optical fiber 28 to vibrate relative to the housing 12, a suitable filler such as a silicone rubber or the like can be placed in the passageway 22 about the optical fiber 28 so as to rigidly secure the optical fiber 28 to the housing to prevent such relative vibration. Also, instead of providing the housing 12 with a passageway 20 for receiving the optical fiber 28, the inside surface 21 of the housing 12 may be provided with groove (not shown) of a dimension sufficient to at least partially and preferably fully receive the optical fiber 28. Further, if desired, the optical fiber 28 can be securely attached to the inner surface 21 of the housing by using a suitable adhesive. With essentially the entire length of the optical fiber 28 being fixedly or rigidly supported in the passageway 20, any independent movement including vibration of the fiber 28 relative to the housing is obviated.

The single mode optical fiber 28 is typically formed of a glass core 30 and provided with a cladding 32 of a suitable polymeric material such as nylon or silicone. If desired the cladding 32 can be encased within a buffer or jacket formed of a another suitable polymeric material.

A second single mode optical fiber 34, which is preferably of the same construction and dimensions as the optical fiber 28, is supported at opposite ends thereof to the upright housing sections 16 and 18 at the planar surface regions 24 and 26 with the balance of the optical fiber 34 providing substantially the full length thereof extending through the open space between the upright housing sections 16 and 18 in a plane overlying the base section 14 of the housing and the optical fiber 28. With the principal length or portion of the optical fiber 34 intermediate the supported opposite ends thereof freely spanning the open space between the upright housing sections 16 and 18, this portion of the optical fiber 34 can undergo vibrational displacement independent of and relative to the housing 12 and the optical fiber 28 fixed therein or thereto. This optical fiber 34 is preferably provided with one or more loops such as generally shown at 36 for promoting the vibrational displacement of the optical fiber as well as providing the optical fiber 34 with a coherence length that substantially corresponds to that of the optical fiber 28. With the above described arrangement of optical fibers 28 and 34, the optical fiber 28 provides the fixed reference signal of the Michelson Interferometer while the optical fiber 34 provides for sensing motion and/or vibration.

The opposite ends of each of the optical fibers 28 and 34 are optically connected to light beam splitter/coupler arrangements such as generally shown at 38 and 40 and which are supported on and fixed to the planar surface regions 24 and 26 of the housing 12. These light splitter/couplers 38 and 40 can be of any suitable commercially available type such as described in U.S. Pat. Nos. 4,449,781 and 4,586,784. These patents are incorporated herein by reference.

A laser light source generally shown at 42 is supported on the planar surface 24 of the housing 12 and is optically coupled to the light beam splitter/coupler 38 for dividing the laser light beam emanating from the laser light source 42 into two separate light paths or beams with one light beam being transmitted through the optical fiber 28 and the other light beam being transmitted through the optical fiber 34. This laser light source 42 can be any suitable type but is preferably of a solid state type which can provide a steady beam of coherent laser light which is suitable for use in the sensor 10 of the present invention.

The coherent laser light beams transmitted through the optical fibers 28 and 34 are combined in the light beam splitter/coupler 40 supported on and attached to the planar surface region 26 of the housing 12. The combined light beams are detected by a photo cell or photo transistor 44 attached to the planar surface 26 of the housing 12 and optically coupled to the beam splitter/coupler 40. The photo cell or photo transistor 44 may be of any suitable commercially available type which is capable of providing analog signals indicative of the frequency and amplitude of the light transmitted through both of the optical fibers 28 and 34.

The analog signal from the photo cell 44 is coupled via line 46 to a conventional fringe counting circuit 48 where the number of fringes produced by the changes in the optical path of the light passing through optical fiber 34 are counted to provide an output signal through line 50 coupled to an appropriate alarm or monitor (not shown) which provides an audio or video signal indicative of the vibration or displacement of the fiber optic sensor 10. As the fiber optic sensor 10 is perturbed, the coherent laser light traveling through the optical fiber 34 undergoes a change in its optical path while the optical path of the light through the optical fiber 28 remains essentially unchanged.

Electrical power for operating the sensor 10 of the present invention can be provided to the fringe counter circuit 48 and the laser light source 42 by employing any suitable power supply such as a remote power supply generally shown at 52 and coupled to the fringe counter circuit and tile laser light source by lines 54 and 56.

Figure 2:
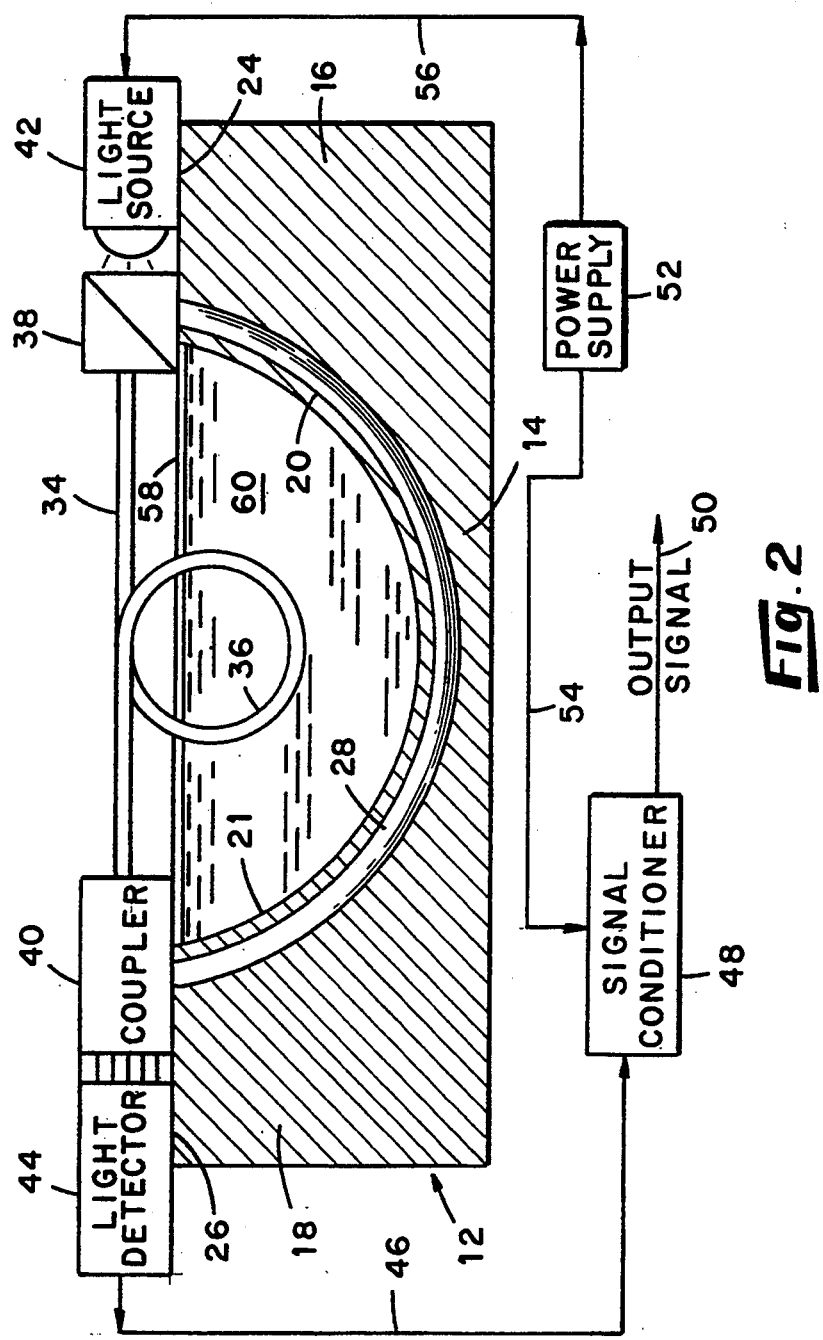
FIG. 2 is a schematic view of a further embodiment of the present invention wherein the vibration detecting optical fiber is immersed in a pool of liquid for damping purposes.

The diameter and free span length of the optical fiber 34 provide a high level of flexibility in determining the sensitivity of the sensor 10. Internal damping of the vibration sensing optical fiber 34 can be provided by varying the diameter of the optical fibers 28 and 34 within the range of about 50 to 500 micrometers so as to tailor the sensor 10 of the present invention to provide for the detection and measurement of vibration or displacements of the optical fiber 34 within a selected range of frequencies and amplitudes. Also, and preferably, the internal damping of the sensor may be achieved by immersing at least a portion of the free span length of the vibration sensing optical fiber 34 in a pool of liquid of a preselected viscosity. As shown in FIG. 2, the upright sections 16 and 18 of the housing 12 are joined together to define a reservoir or receptacle 58 within the housing 12 for containing a pool 60 of a liquid of a selected viscosity such as provided by employing mineral oil or silicone oil of various viscosities. The loop 36 of the vibration sensing optical fiber 34 is shown immersed in the pool 60 of liquid contained in the reservoir 58. However, it will appear clear that substantially the entire free span length of the optical fiber 34 may be immersed in the pool 60 of liquid to further tailor the dampening of the vibration-sensing optical fiber 34.

The selective damping of the vibration-sensing optical fiber can also be achieved by supporting at least the central region of the optical fiber 34 in an enclosed volume that can be pressurized to a selected pressure. This damping embodiment is generally shown by broken lines in FIG. 1 where an appropriately shaped cover 62 of steel or strong plastic is attached to and supported by the upright wall sections 16 and 18 of the housing 12 in an air tight manner so as to provide an enclosed volume 64 containing the vibration-sensing region of the optical fiber 34. By filling the volume 64 via fill tube 66 with any suitable gas or mixture of gases to a selected pressure, the vibration or movement of the vibration-sensing optical fiber 34 can be selectively damped for tailoring the sensitivity of the sensor 10.

In the embodiments of FIGS. 1 and 2, the free span length of the optical fiber 34 is sensitive to vibration and motion. The number of vibration modes of the optical fiber 34 when perturbed provides a large range of sensitivity for the sensor 10 to vibration and displacement. When the light beam reflecting the induced vibrational mode through the optical fiber 34 is recombined with the light beam from the reference optical fiber 28, periodic construction and destructive interference of the combined signal will be received at the photo cell 44 and conveyed to the fringe counting circuit 48. The degree or extent of displacement of vibration detecting optical fiber 34 dictates the total path change or the number of interferences observed in the optical fiber 34 with this number of interferences being indicative of the extent of the vibration and/or motion of the sensor 10.

As pointed out above, by selectively changing the diameter of the fiber, or more preferably, by immersing the fiber in a pool of liquid of a selected viscosity, the vibration and/or motion sensing characteristics of the sensor 10 may be readily tailored to be particularly suitable for a specific application. Also, the motion detector or vibration sensor 10 of the present invention is sensitive in three dimensions to vibration or motion so as to detect and measure the vibration or motion of the sensor regardless of the point of origin. The present invention also has the distinct feature of distinguishing between periodic vibrations and abrupt movements since the optical fiber providing the reference signal is secured in place and does not contribute independent vibrational modes to the combined signal so as to obviate the production of any erroneous signals due to an abrupt motion of the detector.

What is claimed is:

1. A fiber optic vibration sensor comprising a housing, first elongated optical fiber means having first and second oppositely disposed end regions and fixedly supported over substantially the full length thereof to said housing, second elongated optical fiber means having first and second oppositely disposed end regions fixedly supported by said housing and a central region spatially separated from said housing for relative movement thereof with respect to both the housing and the first optical fiber means, light source means for providing a beam of light at a selected frequency, light beam splitting means coupled the first end region of the first and second optical fiber means and adapted to receive the beam of light for splitting the beam of light into first and second light beams for the respective transmission thereof along optical paths through the first and second optical fiber means, light beam coupling means connected to the second end region of the first and second optical fiber means for receiving and combining the total amount of light transmitted through the first and second optical fiber means, light detecting means connected to the light beam coupling means for receiving the light therefrom and providing signals indicative of any changes in the frequency of light transmitted through the first and second fiber means as caused by a change in the optical path of light transmitted through the second optical fiber means upon said relative movement of the second optical fiber means, and fringe counting means connected to the light detecting means for receiving the signals therefrom and for providing a signal indicative of any change in the frequency of light transmitted through the first and second optical fiber means.

2. A fiber optic vibration sensor as claimed in claim 1, wherein the light source means is a laser.

3. A fiber optic vibration sensor as claimed in claim 1, wherein said first and second optical fiber means are single mode glass fibers.

4. A fiber optic vibration sensor as claimed in claim 3, wherein said single mode glass fibers are of a diameter in the range of about 50 to 500 micrometers.

5. A fiber optic vibration sensor as claimed in claim 1, wherein said housing comprises first and second elongated sections having first and second end regions and spatially separated from one another by a third elongated section disposed substantially perpendicular to the first and second sections and contacting the first end region of the first and second sections for defining an open space extending between the second end region of the first and second sections, wherein the first and second end regions of the second optical fiber means are supported by the second end region of the first and second elongated sections with said central region of the second optical fiber means being contained in said open space.

6. A fiber optic vibration sensor as claimed in claim 5, wherein said central region of the second optical fiber means contains at least one complete loop, and wherein the at least one loop contained in the central region of the optical fiber means is spatially separated from the housing for relative movement with respect the housing and the first optical fiber means fixedly supported by said housing.

7. A fiber optic vibration sensor as claimed in claim 6, wherein said first and second optical fiber means are single mode glass fibers, and wherein said light source means is a laser.

8. A fiber optic vibration sensor as claimed in claim 5, wherein the first optical fiber means is fixedly supported by the end sections and the central section of the housing, and wherein the first and second optical fiber means are disposed in a substantially common vertical plane with second optical fiber means overlying at least the central section of the housing.

9. A fiber optic vibration sensor as claimed in claim 5, wherein the end sections of the housing are substantially vertically oriented, and wherein the end sections and the central section of the housing define receptacle means for containing a pool of liquid, and wherein at least a portion of the central region of the second optical fiber means is adapted to be contained in the pool of liquid.

10. A fiber optic vibration sensor as claimed in claim 9, wherein the liquid in said pool of liquid is of a selected viscosity for selectively damping the sensitivity of the second optical fiber means to movement thereof with respect to the housing and the first optical fiber means.

11. A fiber optic vibration sensor as claimed in claim 9, wherein substantially the entire central region of the second optical fiber means is contained in the pool of liquid.

12. A fiber optic vibration sensor as claimed in claim 9, wherein said at least a portion of the central region of the second optical fiber means contains at least one complete loop, wherein said at least one loop is contained in the pool of liquid, and wherein the at least one loop contained in the central region of the optical fiber means is spatially separated from the housing for relative movement with respect the housing and the first optical fiber means fixedly supported by said housing.

13. A fiber optic vibration sensor as claimed in claim 5, wherein cover means are supported by the first and second end regions of the housing for defining an enclosed volume, wherein at least the central region of the second optical fiber means are contained in the enclosed volume, and wherein fill tube means communicate with the enclosed volume for admitting a gas or mixture of gases into the enclosed volume for pressurizing the latter to a selected pressure for selectively damping the sensitivity of at least the central region of the second optical fiber means to movement thereof with respect to the housing and the first optical fiber means.

14. A fiber optic vibration sensor as claimed in claim 1, wherein the fringe counting means is adapted to measure any change in the frequency of light transmitted through the first and second optical fiber means, and wherein said signal from the optical fiber means is indicative of said change in the frequency of light transmitted through the first and second optical fiber means.

* * * * *